United States Patent
Kaitsu et al.

(10) Patent No.: US 6,562,481 B1
(45) Date of Patent: May 13, 2003

(54) MAGNETIC STORAGE MEDIUM

(75) Inventors: Isatake Kaitsu, Kawasaki (JP); Hisateru Sato, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/454,383

(22) Filed: Dec. 3, 1999

(30) Foreign Application Priority Data

Mar. 23, 1999 (JP) .............................. 11-077739

(51) Int. Cl.$^7$ .............................. G11B 5/66; G11B 5/70; H01F 1/00; B32B 15/00
(52) U.S. Cl. .................. 428/611; 428/667; 428/694 T; 428/694 TS; 428/900
(58) Field of Search .............................. 428/65.3, 65.7, 428/694 T, 694 TS, 900, 694 B, 694 BA, 611, 667

(56) References Cited

U.S. PATENT DOCUMENTS

| | | | |
|---|---|---|---|
| 5,063,120 A | * | 11/1991 | Edmonson et al. ...... 428/694 T |
| 5,652,054 A | * | 7/1997 | Kikitsu et al. .............. 428/328 |
| 5,736,262 A | * | 4/1998 | Ohkijima et al. ........... 428/611 |
| 6,080,476 A | * | 6/2000 | Kanbe et al. ............... 428/332 |
| 6,174,597 B1 | * | 1/2001 | Yusu et al. ................. 428/332 |

FOREIGN PATENT DOCUMENTS

JP        09016934        1/1997

* cited by examiner

*Primary Examiner*—Holly Rickman
(74) *Attorney, Agent, or Firm*—Greer, Burns & Crain, Ltd.

(57) ABSTRACT

A magnetic storage medium has a non-magnetic substrate and a recording layer. The recording layer comprises a non-magnetic matrix and crystal grains consisting of a ferromagnetic material. Each of the crystal grains dispersed in the recording layer is a columnar shaped grain which penetrates a suface of the recording layer and has height of 30 nm or less, and a mean value of grain sizes of the crystal grains in an internal direction of the recording layer is 15 nm or less. $(K_u \cdot V)/(k_B \cdot T)$ is not less than 60. A mean value $H_k$ of anisotropic magnetic fields of the plurality of crystal grains is 20 kOe or less.

15 Claims, 4 Drawing Sheets

MAGNETIC STORAGE MEDIUM

BACKGROUND OF THE INVENTION

1. Field of the Invention

The present invention relates to a magnetic storage medium suitable for a magnetic disk unit for performing recording and regeneration of information.

2. Description of the Related Art

As recording information, which is dealt with in an information processing apparatus, is increased, it is needed to provide magnetic storage, which is used as an external storage unit of the information processing apparatus, with a compactness and the larger capacity. For this reason, the magnetic storage needs a magnetic storage medium capable of recording at high recording density. However, according to the conventional magnetic storage medium, it is known that as magnetic information is recorded at higher recording density, $S/N_m$ of the recorded magnetic information to the reproductive signal is lowered (the medium noise $N_m$ is increased with respect to the output S of the reproductive signal).

Generally, a magnetic storage medium has a recording layer on which magnetic information is recorded. One bit of magnetic information is represented by a direction of a total magnetization consisting of an assembly of the respective magnetizations of a plurality of ferromagnetic crystal particles existing in a one bit cell of the recording layer. It may be considered that the magnetizations in the one bit cell are substantially unified in direction in the state that magnetic information is recorded. However, in the event that the magnetization of the adjacent one bit cell is unified in a direction opposite to that of the noticed one bit cell, the direction of the magnetization is reversed through a certain width near a boundary between the adjacent one bit cell-to-one bit cell, but not rapidly changed on the boundary. In an area having such a width, magnetizations oriented in mutually opposite directions are mixed on a zigzag basis. This area is referred to as a magnetization transitional region. One of the causes of the occurrence of the medium noise mentioned above resides in the unevenness of the magnetization.

It is known that the unevenness of the magnetization is caused by a magnetic interaction between crystal particles offering the ferromagnetism. The inventors of the present application proposed a granular magnetic storage medium as a medium in which the magnetic interaction as mentioned above is weakened (Japanese Patent Application Hei. 07-160437). The proposed granular magnetic storage medium has a recording layer in which a plurality of ferromagnetic crystal particles, which consist of an Fe or Fe system-alloy or a Co or Co system-alloy, are dispersed in a non-magnetic material which is of a non-solid solution to those alloys, and are mutually isolated. Thus, the mutual isolation between the plurality of ferromagnetic crystal particles may substantially completely divide the magnetic interaction between the ferromagnetic crystal particles into parts, and thereby reduce the medium noise due to an unevenness of the magnetization in the magnetization transitional region.

The medium noise occurs also owing to an unevenness of a particle size of the ferromagnetic crystal particles. It is considered that the regenerative output is in proportion to the sum total of the volume of ferromagnetic crystal particles. Hence, as the average particle size of one bit cell becomes large, unevenness of a particle size becomes also large. As a result, unevenness of the regenerative output becomes large and thus the medium noise is increased. Therefore, it is considered that the medium noise Nm of the magnetic storage medium is decreased in such a manner that the particle size of the ferromagnetic crystal particles is controlled in the magnetic recording layer of the magnetic storage medium, so that $S/N_m$ is improved.

However, with respect to the magnetization recorded on the ferromagnetic crystal particles in which the magnetic interaction is divided into parts and magnetically isolated, as the particle size of the ferromagnetic crystal particles is decreased, the energy $K_u \cdot V$ (anisotropy energy x volume of particle) representative of a degree of easy orientation of magnetization of the particle into a predetermined direction is reduced. When the energy $K_u \cdot V$ is reduced, a thermal fluctuation phenomenon wherein a direction of magnetization fluctuates owing to the heat will occur. Consequently, in a case where the particle size of the ferromagnetic crystal particles is less than a predetermined size, there occurs, even in the room temperature, the thermal fluctuation phenomenon in magnetization of each of the ferromagnetic crystal particles. This is associated with a problem that the recording magnetization on a one bit cell consisting of the total sum of pieces of magnetization of the ferromagnetic crystal particles disappears.

In order to maintain the energy $K_u \cdot V$ with a large value while the volume of ferromagnetic crystal particles is reduced, it is considered that one having the large anisotropy energy $K_u$ is adopted as the material of the ferromagnetic crystal particles. However, with a conventional recording head now generally used, it is difficult to generate such a strong magnetic field that the magnetization of the crystal particles having such a large anisotropy energy $K_u$ is reversed. This is associated with a problem that an overwrite characteristic (O/W) of a magnetic storage medium, which is represented by a ratio of magnitudes of a reproductive output of magnetic information remained at the time of re-recording of magnetic information and a regenerative output of magnetic information newly recorded, is deteriorated.

SUMMARY OF THE INVENTION

In view of the foregoing, it is an object of the present invention to provide a magnetic storage medium capable of recording information at high recording density and also to regenerating the information with a high quality of signal (high $S/N_m$), and in addition contributing to the elongation of a life span of the recorded information.

To achieve the above-mentioned objects, the present invention provides a magnetic storage medium comprising:

(1) a non-magnetic substrate;

(2) a recording layer in which a plurality of crystal grains consisting of a ferromagnetic material are dispersed in a non-magnetic material and axes of easy magnetization of the plurality of crystal grains are oriented in parallel to the layer, wherein each of the plurality of crystal grains dispersed in the recording layer is a columnar shaped grain which penetrates a surface of said recording layer and has height of 30 nm or less, and a mean value of grains diameter of said recording layer is 15 nm or less.

Furthermore, $(K_u \cdot V)/(k_B \cdot T)$ is preferably not less than 60 where $(K_u \cdot V)/(k_B \cdot T)$ denotes a ratio of a product of a mean value $K_u$ (unit: erg/cm$^3$) of anisotropy energies of the plurality of crystal grains and a mean value V (unit: cm$^3$) of volumes of the plurality of crystal grains to a product of Boltzmann constant $k_B$ (unit: erg/K) and temperature T (unit: K), and a mean value $H_K$ of anisotropic magnetic fields of the plurality of crystal grains is 20 kOe or less.

As a magnetic storage medium of the next generation, a magnetic storage medium having a high recording density exceeding 10G bit/inch$^2$ is desired. A size of one bit cell of the magnetic storage medium having a recording density exceeding 10G bit/inch$^2$ is 100 nm×600 nm or so.

In the event that such a large size of one bit cell is provided, a magnetic storage medium of the present invention has characteristics set forth below.

First, according to the magnetic storage medium of the present invention, a mean value of grain sizes of the plurality of crystal grains in an internal direction of the recording layer is kept below 15 nm. This feature makes' it possible that the magnetic storage medium offers a high $S/N_m$ not less than 25 dB in which magnetic information to be stored is reproduced with great accuracy. Further, in the event that the plurality of crystal grains have such a grain size, the thickness of the recording layer is kept below 30 nm. This feature makes it possible to keep the width of the magnetization transitional region below a predetermined value, and thereby enhancing a resolution which is an index indicative of a recording density involved in an effective recording. Furthermore, according to the magnetic storage medium of the present invention, $(K_u \cdot V)/(k_B \cdot T)$ is not less than 60. This feature makes it possible to prevent the thermal fluctuation of magnetization of a plurality of crystal grains of the recording layer whereby magnetic information to be stored in the recording layer is ensured a longer life, necessary for practical usage. Still further, according to the magnetic storage medium of the present invention, the mean value $H_K$ of anisotropic magnetic fields of the plurality of crystal grains is 20 kOe or less. This feature makes it possible to offer a satisfactory O/W.

In order to obtain a value of O/W requested for a practical use through a further improvement of O/W, it is effective that the mean value $H_K$ is further decreased. It should be noted that generally, the mean value $H_u$ (unit: erg/cm$^3$) of anisotropy energies of the crystal grains is decreased while the mean value $H_K$ of anisotropic magnetic fields of the plurality of crystal grains is decreased. Consequently, too much reduction of the mean value $H_K$ brings about reduction of the mean value $K_u$. As a result, $(H_u \cdot V)/(k_B \cdot T)$ goes down below 60 (limit value). However, according to the magnetic storage medium of the present invention, each of the crystal grains dispersed in the recording layer is a columnar shaped grain which penetrates a surface of the recording layer. Hence, according to the magnetic storage medium of the present invention, as compared with a case where the spherical crystal grains are imbedded, the crystal grains are advantageous in volume in a height direction, and thereby increasing the mean value V of volumes of the crystal grains. The increment of the mean value V of volumes of crystal grains may maintain the value of $(H_u \cdot V)/(k_B \cdot T)$, while permitting the reduction of $H_K$ and the reduction of $H_K$ as well.

Further, even if the same $H_K$ is concerned, according to the magnetic storage medium of the present invention, each of the crystal grains of the recording layer penetrates the recording layer, and therefore the magnetization of the crystal grains is oriented in an internal direction of the recording layer on a priority basis. The orientation of the magnetization of the crystal grains is easy to reverse using a magnetic field of the head when magnetic information is being rewritten, and thus the O/W of the magnetic storage medium is further improved.

As mentioned above, the magnetic storage medium according to the present invention has a high resolution and a high $S/N_m$ as well, and can store magnetic information having a long life necessary for practical usage, and offers a high O/W in a practical use of level.

In the magnetic storage medium according to the present invention as mentioned above, it is preferable that the substrate is a disk-like shaped substrate, and the axes of easy magnetization of the crystal grains included in the recording layer are oriented to a circumference direction of the disk-like shaped substrate.

Generally, a magnetic storage medium having a high recording density is formed on a disk-like shaped substrate, and a direction of a magnetic field of a head for recording and reproducting magnetic information on the magnetic storage medium is oriented to a circumference direction of the disk-like shaped substrate. When the axes of easy magnetization of the plurality of crystal grains included in the recording layer are oriented to a circumference direction of the disk-like shaped substrate, the magnetic storage medium is improved in O/W. Further, this orientation causes the coercive force $H_c$ of the medium in a circumference direction to be increased, so that a width of the magnetization transitional region is narrowed. Thus, the magnetic storage medium is enhanced in the resolution.

Further, in the magnetic storage medium according to the present invention as mentioned above, it is preferable that the crystal grains of said recording layer consist of an alloy including Co and Pt.

Co is a ferromagnetic material having a hexagonal crystal structure and an uniaxial crystal magnetic anisotropy, and is suitable for a material of a recording layer since the magnetization it easy to be oriented. The addition of Pt to Co makes it possible to enhance a coercive force $H_c$ of the recording layer. Thus, the magnetic storage medium having the crystal grains consisting of an alloy including those elements is improved in the resolution.

Further, in the magnetic storage medium according to the present invention as mentioned above, it is preferable that the non-magnetic material of the recording layer consists of an oxide ceramics.

Since the oxide ceramics is of a non-solid solution to a metal, according to the magnetic storage medium having such a structure, it is possible to expect a preferable separation between the crystal grains. Thus, the medium noise $N_m$ of the magnetic storage medium is decreased, and $S/N_m$ is improved.

Further, in the magnetic storage medium according to the present invention as mentioned above, it is preferable that
  (3) a primary layer consisting of a non-magnetic material is interposed between the substrate and the recording layer.

The crystal grains are subjected to a hetero-epitaxial growth on the interface of the upper portion of the primary layer. Therefore, the magnetization of the crystal grains is increased in orientation.

Further, in the magnetic storage medium according to the present invention as mentioned above, it is preferable that said primary layer consists of an alloy including Cr.

A face interval of the (110) of Cr is close to a face interval of the (002) of the CoPt-alloy of the crystal grains. Thus, when the crystal grains are subjected to a hetero-epitaxial growth on the interface of the upper portion of the primary layer, the magnetization of the crystal grains is oriented in an internal direction of the recording layer on a priority basis.

Further, in the magnetic storage medium having the primary layer (3) as mentioned above, it is preferable that an intermediate layer consisting of a non-magnetic material, which is different from the material constituting the primary layer, is interposed between the primary layer and the recording layer.

The intermediate layer is disposed between the primary layer and the recording layer. The use of the intermediate layer makes it possible to reduce an unevenness of the grain sizes of a plurality of crystal grains included in the recording layer. Consequently, the magnetic storage medium having the intermediate layer offers a high $S/N_m$.

In the magnetic storage medium having the intermediate layer as mentioned above, it is preferable that the primary layer consists of an alloy including Cr, and the crystal grains of the recording layer consist of an alloy including Co and Pt, and in addition the intermediate layer consists of an alloy including Co and Cr.

The alloy including Co and Cr is an intermediate material between an alloy including Co and Pt of the recording layer and an alloy including Cr of the primary layer, and thus suitable as a material of the intermediate layer between the recording layer and the primary layer. Further, the crystal grains of the recording layer can be subjected to a hetero-epitaxial growth on the intermediate layer.

Further, in the magnetic storage medium having the primary layer (3) as mentioned above, it is preferable that a seed layer consisting of a material, which is different from the material constituting the primary layer, is interposed between the substrate and the primary layer.

A surface of the substrate is sparse. Interposing the seed layer between the substrate and the primary layer provides a smoothness of a surface of the primary layer. The smoothness of the primary layer makes it possible to improve the crystal grains of the recording layer in an orientation of the magnetization.

DETAILED DESCRIPTION OF PREFERRED EMBODIMENTS

Hereinafter, there will be described a magnetic storage medium according to embodiments of the present invention.

Before describing the structure of the magnetic storage medium according to embodiments of the present invention, there will be described four structural conditions necessary for the ferromagnetic crystal particles included in a recording layer of a magnetic storage medium having a high recording density exceeding 10 G bit/inch$^2$, which is desired as a magnetic storage medium of the next generation.

Figure 1:
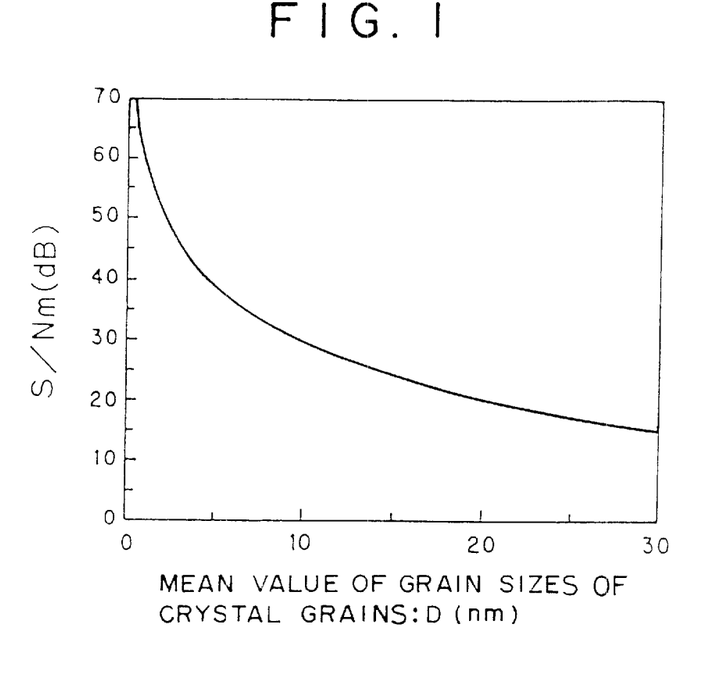
FIG. 1 is a graph showing an $S/N_m$ to a grain size D of a crystal grain in the event that a magnetic storage medium having a recording density of 10 G bit/inch$^2$ is adopted as a model.

First, it is required for the magnetic storage medium to have $S/N_m$ not less than 25 dB with which magnetic information to be stored therein can be reproduced with great accuracy. In practical use, it is considered that at least such a degree of $S/N_m$ is necessary. In order to estimate $S/N_m$ to the grain size D of a ferromagnetic crystal grain in a recording layer of the magnetic storage medium, the following equation of $S/N_m$, which is given in the publication:

[H. Neal Bertram, Hong Zhou and Roy Gustafson: "Signal to Noise Ratio Scaling and Density Limit Estimates in Longitudinal Magnetic Recording", IEEE Trans. Magn., Vol. 34, p1845, June 1998.], is utilized.

$$S/N_m \approx \frac{0.31 \gamma B^2 W}{\alpha^2 D^3}$$

where a coefficient γ is 2, and a coefficient α is 2.

Incidentally, in this equation, it is assumed that crystal grains mutually almost have no magnetic interaction. In the magnetic storage medium having a recording density of 10 G bit/inch$^2$, the bit length (length of one bit cell) B is 100 nm or so, and the track width (width of one bit cell) W is 600 nm or so. An $S/N_m$ to a grain size D of the crystal grain in the magnetic storage medium having one bit cell of such a magnitude is shown in FIG. 1.

FIG. 1 is a graph showing an $S/N_m$ to a grain size D of a crystal grain in the event that a magnetic storage medium having a recording density of 10 G bit/inch$^2$ is adopted as a model.

The axis of abscissas denotes a grain size D (nm) of the crystal grain, and the axis of ordinates denotes an $S/N_m$ (dB). In the graph, a solid line denotes an $S/N_m$ (dB) of the magnetic storage medium having a recording layer consisting of a plurality of crystal grains, each having the grain size D (nm). As shown by the solid line, as the grain size D increases from 1 nm or so to 30 nm, the $S/N_m$ is monotonously decreased from 60 dB or so to 15 dB. In order to obtain the $S/N_m$ not less than 25 dB as mentioned, it would be understood from this graph that the grain size D is to be 15 nm or less. It is better that the $S/N_m$ of 30 dB or so, which is required in the usual signal processing, is obtained. In order to obtain such an $S/N_m$, as will be understood from the graph, it is preferable that the grain size D is 10 nm or less.

Figure 2:
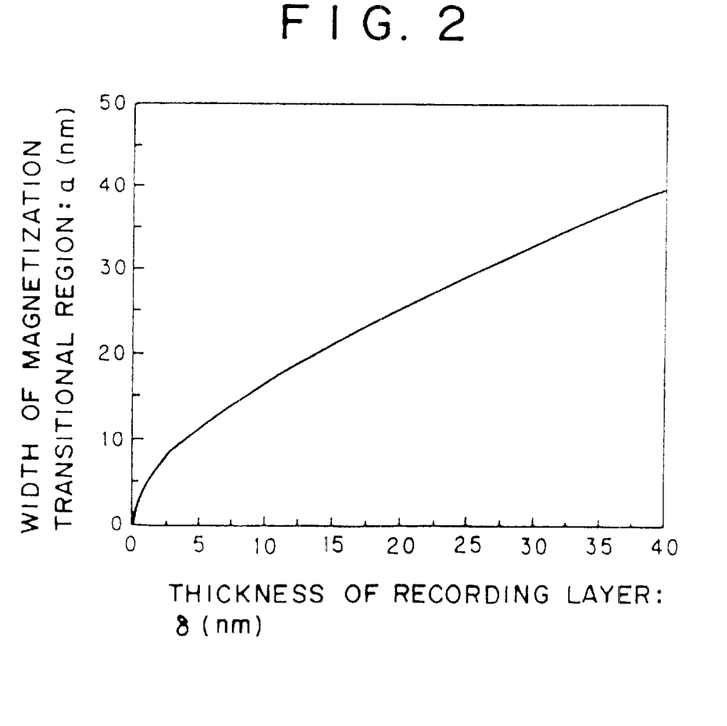
FIG. 2 is a graph showing a width a of a magnetization transitional region to a thickness δ of a recording layer.

Further, it is important for the magnetic storage medium having a high recording density exceeding 10 G bit/inch$^2$ to be provided with a high resolution. A factor of determining a resolution at the medium end is a magnitude of width a of the magnetization transitional region. A dependency of the width a of the magnetization transitional region to the thickness δ of the recording layer is represented by equation set forth below.

$$a = \left[ \frac{4 M_r \delta \left( d + \frac{\delta}{2} \right)}{H_c} \right]^{1/2}$$

It is assumed that a residual magnetization density M of the recording layer is 500 emu/cc, a magnetic spacing representative of a distance between a head and the recording layer is 30 nm, and a coercive force $H_c$ of the recording layer is 2500 Oe. Those values are set up for the magnetic storage medium having a recording density of 10 G bit/inch$^2$. A magnitude of the width a of the magnetization transitional region to the thickness δ of the recording layer is shown in FIG. 2.

FIG. 2 is a graph showing a magnitude of the width a of the magnetization transitional region to the thickness δ of the recording layer.

The axis of abscissas denotes a thickness δ (nm) of the recording layer, and the axis of ordinates denotes the width a (nm) of the magnetization transitional region. In the graph, a solid line denotes the width a (nm) of the magnetization transitional region of the magnetic storage medium having the recording layer. As shown by the solid line, as the thickness δ increases from 0 nm to 40 nm, the width a (nm) of the magnetization transitional region is monotonously decreased from 0 nm to 40 nm.

Generally, it is considered through an experiment that the width a (nm) of the magnetization transitional region can be reduced to approximately twice the grain size D. For example, the width a (nm) of the magnetization transitional region of the recording layer of the magnetic storage medium having the crystal grain of 15 nm in the grain size D can be reduced to 30 nm. Further, it is preferable that the above-mentioned magnetic storage medium having the crystal grain of 15 nm or less in the grain size D is at most 30 nm in the width a (nm) of the magnetization transitional region of the recording layer of the magnetic storage medium, in order to implement high resolution. For this reason, as will be understood from the graph of FIG. 2, it is requested that the thickness δ of the recording layer is 30 nm or less. In the event that the grain size D of 10 nm as mentioned above is set as a standard, 20 nm of the width a (nm) of the magnetization transitional region is desired. Thus, it is more preferable, as will be understood from the graph of FIG. 2, that the thickness δ of the recording layer is 15 nm or less.

Further, it is requested for the magnetic storage medium that magnetic information carried by the magnetization of the crystal grain of the recording layer has a long life. As mentioned above, the life of the magnetic information is longer with greater $(K_u \cdot V)/k_B \cdot T)$. From this point, it is preferable that $(K_u \cdot V)/(k_B \cdot T)$ is not less than 60 with which the magnetic storage medium may maintain the magnetic information in accordance with a technology of re-writing at regular intervals of time (cf. [Pu-Ling Lu and Stanley H. Ch a rap. "Thermal instability at 10 G bit /in$^2$ magnetic recording". IEEE Trans. Magn., vol. 30, no. 6, Nov. 1994]).

Further it is important for the magnetic storage medium to offer an enough O/W. A limit of a writing magnetic field of a magnetic head for performing a writing of magnetic information is restricted by a saturation magnetization strength $B_s$ of a head material. The highest saturation magnetization strength $B_s$ of head material is 2T (corresponding to 20 kOe) or so. It is considered that the use of such a material makes it possible to generate a writing magnetic field of 10 kOe or so. For this reason, it is preferable for the magnetic storage medium that the mean value $H_K$ of anisotropic magnetic fields of a plurality of crystal grains of the recording layer is suppressed to 10 kOe or less so as to offer a preferable O/W.

Hereinafter, there will be explained embodiments of the present invention, which satisfy the above-mentioned four conditions.

Figure 3:
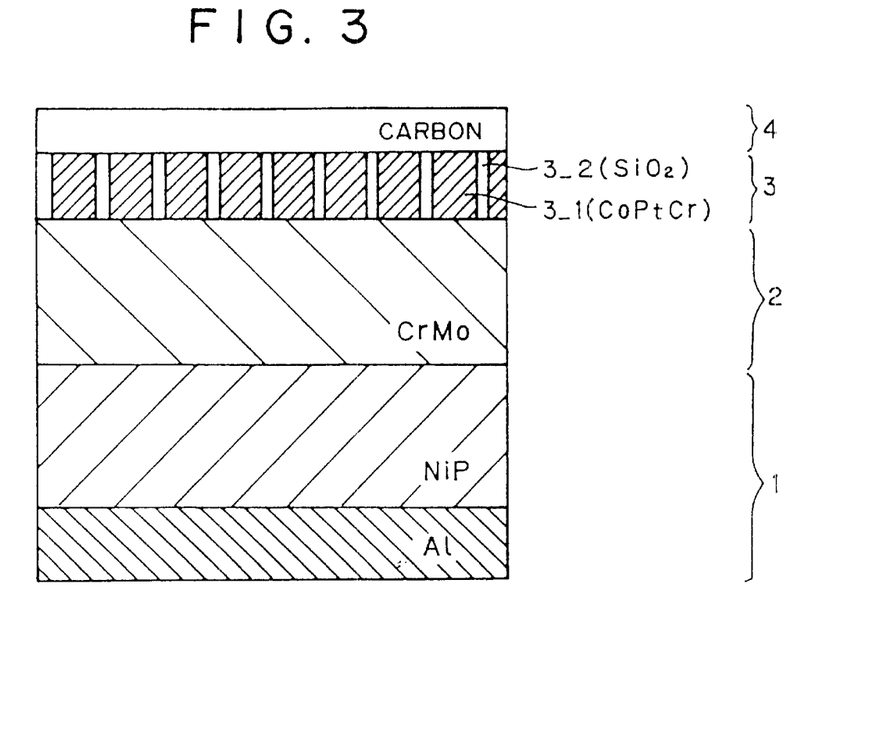
FIG. 3 is a view showing a sectional structure of a magnetic storage medium according to the first embodiment of the present invention.

FIG. 3 is a view showing a sectional structure of a magnetic storage medium according to the first embodiment of the present invention.

The magnetic storage medium according to the first embodiment of the present invention comprises a substrate 1, a primary layer 2, a recording layer 3 and a protective layer 4. The substrate 1 comprises an aluminum disk substrate which is coated with NiP. The primary layer 2 having the thickness of 50 nm is formed adjacent to the substrate 1. The recording layer 3 having the thickness of 15 nm is formed on the top of the primary layer 2.

The recording layer 3 is one in which a plurality of ferromagnetic crystal grains 3_1 consisting of an alloy of $Co_{80}Pt_{15}Cr_5$ (at %) are dispersed in an $SiO_2$ matrix 3_2. Each of the crystal grains 3_1 is a columnar grain penetrating the recording layer 3 in a direction of the film thickness, wherein a mean value of grain sizes of the crystal grains 3_1 is about 12 nm and a mean value of heights is 15 nm of the thickness of the recording layer 3. With respect to the recording layer 3, the crystal grains 3_1 and the $SiO_2$ matrix 3_2 occupy 50% in volume, respectively. It is acceptable that an oxide ceramics other than $SiO_2$ is used as a non-magnetic material. It is noted that composition of an alloy will be expressed by at % hereinafter.

$Co_{80}Pt_{15}Cr_5$ constituting the crystal grains 3_1 is a hexagonal alloy representative of a ferromagnetism, and the magnetization thereof has a uniaxial crystal anisotropy with respect to a direction perpendicular to (001) face.

The $SiO_2$ matrix 3_2, which divides the crystal grains 3_1 into part, is a non-magnetic oxide. Since the oxide ceramics is of a non-solid solution to a metal, according to the magnetic storage medium having such a structure, it is possible to expect a preferable separation between the crystal grains 3_1.

The primary layer 2 mediates between the recording layer 3 and the substrate 1. The primary layer 2 is formed with an alloy having the body-centered cubic structure of the composition of $Cr_{50}Mo_{50}$ (at %). A face interval of the (110) of Cr is close to a face interval of the (002) of the CoPt-alloy of the crystal grains 3_1. Thus, the crystal grains 3_1 are subjected to a hetero-epitaxial growth on the interface of the upper portion of the primary layer 2. Therefore, the magnetization of the crystal grains 3_1 is oriented in an internal direction of the recording layer 3 on a priority basis. Incidentally, it is preferable that a Cr-alloy is used as the material of the primary layer. It is acceptable that the Cr-alloy other than $Cr_{50}Mo_{50}$ is used. Alternatively, as the material of the primary layer, it is acceptable to use an alloy including V, Mo, W, or Ni, or an oxide or a nitride.

The magnetic storage medium has the protective layer 4 having the thickness 10 nm adjacent to the upper portion of the recording layer 3. The protective layer 4 consists of a hard carbon and protects the recording layer 3.

The respective layers constituting the magnetic storage medium are formed in form of a film by a sputtering. Table 1 shows a condition of the sputtering.

TABLE 1

| Material | Ar pressure (mTorr) | Ts (° C.) | Sputtering Power (kW) | RF Bias (W) |
|---|---|---|---|---|
| CrMo | 5 | 25 | 0.5 (DC) | 0 |
| CoPtCr—SiO$_2$ | 5 | 25 | 0.2 (RF) | 20 |
| C | 10 | 25 | 1.0 (DC) | 0 |

The left column shows a CrMo-alloy, a CoPtCr-alloy and SiO$_2$, and C, which are materials of the primary layer 2, the recording layer 3, and the protective layer 4, respectively. The subsequent columns in right show in turn an Ar pressure (mTorr), a substrate temperature Ts(° C.), a sputtering power (kW) of DC or RF, and an RF Bias (W). First, the primary layer 2 consisting of $Cr_{50}Mo_{50}$ is formed into a film with an Ar pressure of 5 mTorr, a substrate temperature Ts of 25° C., and a sputtering power of 0.5 kW of DC. No RF Bias power is applied to the substrate. Next, the recording layer 3 consisting of $Co_{80}Pt_{15}Cr_5$ and $SiO_2$ is formed into a film as a CoPtCr-$SiO_2$ composite film in such a manner that a CoPtCr target and an $SiO_2$ target are subjected to a simultaneous discharge with an Ar pressure of 5 mTorr, a substrate temperature Ts of 25° C., and a sputtering power of 0.2 kW of RF. At that time, the RF Bias power of 20W is applied to the substrate so as to promote a fine deposition of the crystal grains 3_1 in the $SiO_2$ matrix 3_2. Lastly, the protective layer 4 consisting of C is formed into a film with an Ar pressure of 10 mTorr, a substrate temperature Ts of 25° C., and a sputtering power of 1.0 kW of DC. No RF Bias power is applied to the substrate.

The property of the above-mentioned magnetic storage medium will be compared with the conventional granular medium. Before the comparison, the structure of the conventional granular medium in conjunction with FIG. 4 will be explained.

Figure 4:
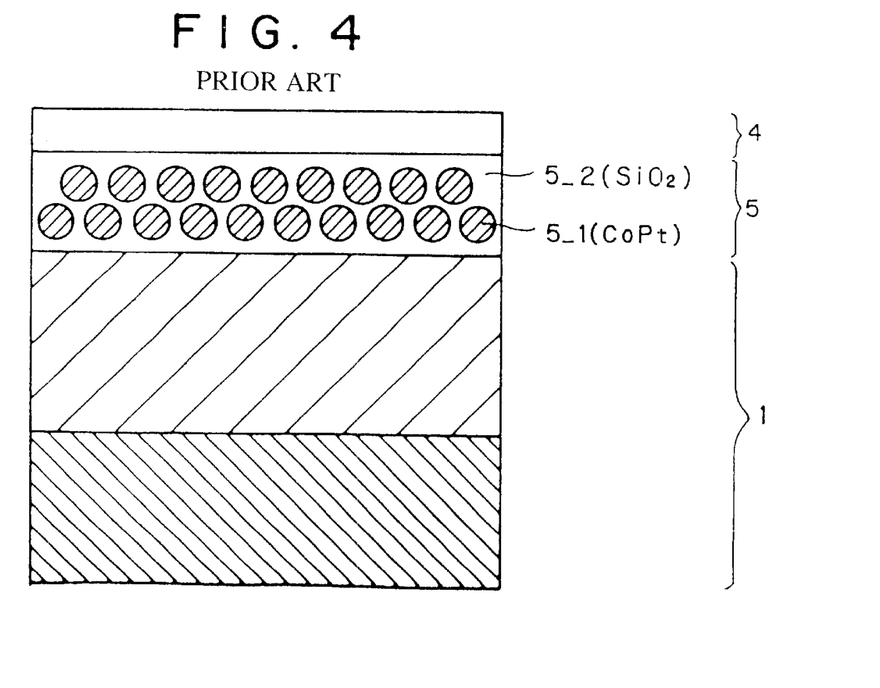
FIG. 4 is a view showing a sectional structure of the conventional granular medium.

FIG. 4 is a view showing a sectional structure of the conventional granular medium.

The conventional granular medium is different from the above-mentioned magnetic storage medium in the points that the conventional granular medium has no primary layer and the recording layer is different in structure. A protective layer of the conventional granular medium is the same as the protective layer 4 of the above-mentioned magnetic storage medium. A substrate of the conventional granular medium is the same as the substrate 1 of the above-mentioned magnetic storage medium, except for the thickness. However, the change of the thickness of the substrate almost has no effect on the property of the magnetic storage medium.

The recording layer 5 has a thickness of 20 nm, and comprises a plurality of spherical crystal grains 5_1 and an $SiO_2$ matrix 5_2. The crystal grains 5_1 consist of an alloy of a composition of $Co_{80}Pt_{20}$ (at %) offering ferromagnetism. A mean value of grain sizes of the crystal grains 5_1 is about 12 nm. With respect to the recording layer 5, the crystal grains 5_1 and the $SiO_2$ matrix 5_2 occupy 50% in volume, respectively. The plurality of spherical crystal grains 5_1 are dispersed in the $SiO_2$ matrix 5_2, and a major part of the crystal grains 5_1 is covered in its entire surface by the $SiO_2$ matrix 5_2. For this reason, the crystal grains 5_1 are not subjected to a hetero-epitaxial growth, and an orientation of the magnetization is of almost three-dimensional isotropy. The recording layer 5 is formed into a film in the same condition as the formation of the recording layer 3 in the first embodiment but a thickness. Incidentally, the conventional granular medium is also formed to satisfy the above-mentioned four conditions for the purpose of a comparison with the first embodiment.

Measurement results of magnetostatic characteristics and electromagnetic transfer characteristics of the conventional magnetic storage medium and the magnetic storage medium according to the above-mentioned first embodiment will be described referring to Table 2 hereinafter.

TABLE 2

| Media | $S_{iso}/N_m$ (dB) | $H_k$ (kOe) | $H_C$ (kOe) | $D_{50}$ (kFCI) | $(K_u V)/(k_B T)$ | O/W (dB) |
|---|---|---|---|---|---|---|
| Conventional medium | 28 | 10 | 2.0 | 115 | 84 | 20 |
| First medium | 28 | 7 | 2.2 | 130 | 85 | 30 |

The left column of Table 2 shows a sort of media. In the sort of media, there are two types: the conventional granular medium ("conventional medium" in Table 2) and the magnetic storage medium according to the first embodiment ("first medium" in Table 2). The subsequent columns in right show the $S_{iso}/N_m$ (dB), the mean value $H_k$ (kOe) of anisotropic magnetic fields of a plurality of crystal grains, the coercive force $H_c$ of the medium (kOe), the $D_{50}$ (kFCI) which is indicative of resolution, $(K_u V)/(k_B T)$, and the O/W (db). Incidentally, also in Tables 3 to 5, similar to Table 2, a plurality of sorts of measurement results for two types of media will be shown.

$S_{iso}/N_m$ is a ratio of an output signal voltage $S_{iso}$ involved in reproduction of magnetic information in the state of a solitary wave having a low track recording density near 0 kFCI (Kilo Flux Changes per Inch) to a medium noise $N_m$ involved in reproduction of magnetic information recorded at the linear recording density of 160 kFCI. $S_{iso}/N_m$ for both the media is assessed using an MR head having a core width of 1.5 μm. Both the media of the conventional granular medium and the magnetic storage medium according to the first embodiment offered high $S_{iso}/N_m$ of 28 dB over 25 dB. One of this reasons is that crystal grains included in the recording layer of any of those media are divided in part and have no magnetic interaction, and as a result an unevenness of the magnetization in the magnetization transitional region of the recording layer is small, and whereby the medium noise $N_m$ of the magnetic storage medium having such a recording layer is low. Another reason is that in any media, a mean value of grain sizes of a plurality of crystal grains is small as about 12 nm.

Next, with respect to the mean value $H_K$ of anisotropic magnetic fields of a plurality of crystal grains, the conventional granular medium offered 10 kOe, and the magnetic storage medium according to the first embodiment offered 7 kOe. A difference as to the anisotropic magnetic fields between both the media is caused by a difference between the compositions of the crystal grains of both the media.

With respect to the coercive force $H_c$, the conventional granular medium offered 2.0 kOe, and the magnetic storage medium according to the first embodiment offered 2.2 kOe. As mentioned above, the magnetic storage medium according to the first embodiment has the mean value $H_K$ of anisotropic magnetic fields, which is smaller than the conventional granular medium. However, as mentioned above, in the magnetic storage medium according to the first embodiment, the crystal grains of the recording layer penetrate the recording layer, and thus the magnetic storage medium according to the first embodiment is larger in orientation as compared with the conventional granular medium. Consequently, both the media offered the similar value of the coercive force $H_c$.

Next, the $D_{50}$ will be described. Generally, with magnetic information recorded in higher track recording density, a reproduction output is decreased when the magnetic information is reproduced. $D_{50}$ denotes a linear recording density in which there is recorded magnetic information indicative of a reproductive output of a half of a reproductive output of magnetic information recorded at a linear recording density of 0 kFCI. With respect to $D_{50}$, the conventional granular medium offered 115 kFCI, and the magnetic storage medium according to the first embodiment offered 130 kFCI. Since both the media have a thin recording layer of 30 nm or less, such a high $D_{50}$ is offered.

Next, with respect to $(K_u \cdot V)/(k_B \cdot T)$, the conventional granular medium offered 84, and the magnetic storage medium according to the first embodiment offered 85. In the magnetic storage medium according to the first embodiment, the mean value $H_K$ of anisotropic magnetic fields is smaller as compared with the conventional granular medium, and thus the mean value $H_u$ of anisotropy energy is also smaller. However, according to the magnetic storage medium according to the first embodiment, crystal grains of the recording layer 3 are of columnar shaped ones, and thus it is advantageous in volume in a height direction. Therefore, as compared with the spherical crystal grains having the same grain size, a mean value V of volumes of the crystal grains of the recording layer 3 is increased. Consequently, both the media offered the similar value of $(K_u \cdot V)/(k_B \cdot T)$.

Lastly, with respect to O/W, the conventional granular medium offered 20, and the magnetic storage medium according to the first embodiment offered 30. In the magnetic storage medium according to the first embodiment, the mean value $H_K$ of anisotropic magnetic fields is smaller as compared with the conventional granular medium, and the crystal grains of the recording layer penetrate the recording layer. Therefore, the magnetization of the crystal grains is oriented in an internal direction of the recording layer 3 on a priority basis. In this manner, the oriented magnetization in which the mean value $H_K$ of anisotropic magnetic fields is smaller is easy to be reversed by a magnetic field of the head when magnetic information is re-written. This is a reason why the magnetic storage medium according to the first embodiment offered a high value of O/W.

As mentioned above, the magnetic storage medium according to the first embodiment has a high resolution and a high $S/N_m$ as well, and further may store magnetic information having a long life necessary for practical uses, and offers a high O/W in a practical use of level.

Incidentally, it is preferable that the crystal grains 3_1 are arranged with uniformity in density, since the presence of a sparse portion and/or a dense portion invites the increment of the medium noise, and it is also desired that the crystal grains 3_1 are arranged with an orientation involving the closest density so that the reproductive output is increased.

Figure 5:
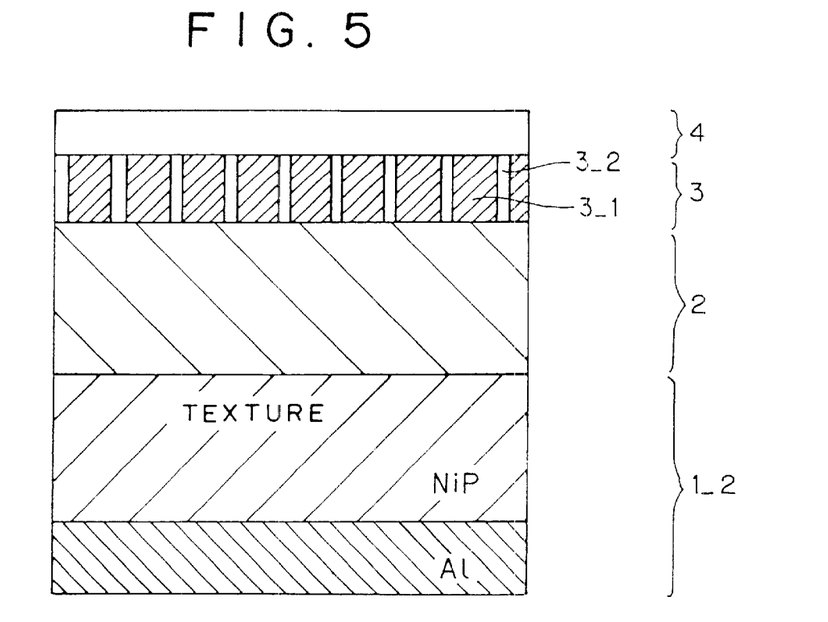
FIG. 5 is a view showing a sectional structure of a magnetic storage medium according to the second embodiment of the present invention.

Next, the second embodiment of present invention will be explained. FIG. 5 is a view showing a sectional structure of a magnetic storage medium according to the second embodiment of the present invention.

FIG. 5 is a view showing a sectional structure of a magnetic storage medium according to the second embodiment of the present invention.

The magnetic storage medium according to the second embodiment is different from the magnetic storage medium according to the first embodiment only in the point that the substrate 1_2 is provided with a texture. The texture is shaped as a stripe extending in a circumference direction of the disk of the substrate 1_2 at intervals of 15 Å. Formation of such a texture causes a magnetization of a plurality of crystal grains of the recording layer 3 to provide such a phenomenon that an axis of easy magnetization is oriented in a circumference direction of the disk of the substrate 1_2 on a priority basis.

Measurement results of magnetostatic characteristics and R/W (Read/Write) characteristics of the magnetic storage medium according to the above-mentioned second embodiment and the magnetic storage medium according to the first embodiment will be described referring to Table 3 hereinafter.

TABLE 3

| Media | $S_{iso}/N_m$ (dB) | $H_c$ [CIRC] (kOe) | $H_c$ [DIA] (kOe) | $D_{50}$ (kFCI) | O/W (dB) |
|---|---|---|---|---|---|
| 1st medium | 28 | 2.2 | 2200 | 130 | 30 |
| 2nd medium | 29 | 2.5 | 2100 | 140 | 35 |

The left column of Table 3 shows a sort of media. In the sort of media, there are two types: the magnetic storage medium according to the first embodiment ("1st medium" in Table 3) and the magnetic storage medium according to the second embodiment ("2nd medium" in Table 3). The subsequent columns in right show the $S_{iso}/N_m$ (dB), the coercive force $H_c$ (kOe) of the medium in a circumference direction, the coercive force $H_c$ (kOe) of the medium in a diametral direction, the $D_{50}$ (kFCI) which is indicative of resolution, and the O/W (dB). According to the magnetic storage medium according to the second embodiment, as compared with the magnetic storage medium according to the first embodiment, $S_{iso}/N_m$ is improved from 28 dB to 29 dB, the coercive force $H_c$ of the medium in a circumference direction is improved from 2.2 kOe to 2.5 kOe, the coercive force $H_c$ of the medium in a diametral direction is decreased from 2.2 kOe to 2.1 kOe, $D_{50}$ is improved from 130 kFCI to 140 kFCI, and O/W is improved from 30 dB to 35 dB. The improvement of the coercive force $H_c$ of the medium in a circumference direction and the decrement of the coercive force $H_c$ of the medium in a diametral direction show the fact that an axis of easy magnetization of crystal grains of the recording layer 3 is oriented in a circumference direction of the substrate 1_2 on a priority basis owing to the presence of the texture. This orientation brings about the improvements of $S_{iso}/N_m$, $D_{50}$ and O/W.

Incidentally, according to the magnetic storage medium according to the second embodiment, the axis of easy magnetization is oriented by an establishment of the texture on the substrate 1_2 in the circumference direction. However, it is acceptable for the magnetic storage medium according to the present invention that the axis of easy magnetization is oriented by a membrane stress by the substrate heating and the film fabrication in the magnetic field at the time of film fabrication of the recording layer.

Figure 6:
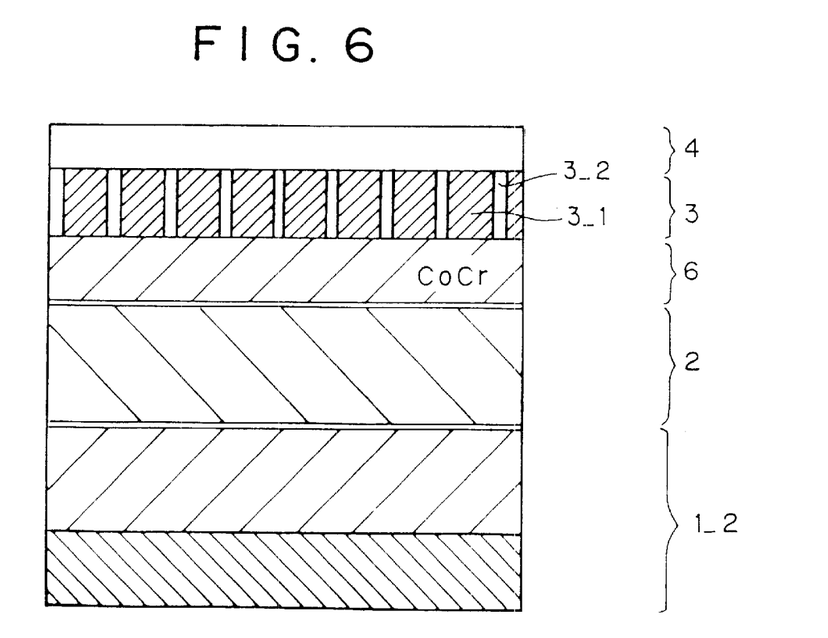
FIG. 6 is a view showing a sectional structure of a magnetic storage medium according to the third embodiment of the present invention.

Next, the third embodiment of present invention will be explained. FIG. 6 is a view showing a sectional structure of a magnetic storage medium according to the third embodiment of the present invention.

FIG. 6 is a view showing a sectional structure of a magnetic storage medium according to the third embodiment of the present invention.

The magnetic storage medium according to the third embodiment is different from the magnetic storage medium according to the second embodiment only in the point that an intermediate layer 6 having a thickness of 5 nm is disposed between the primary layer 2 and the recording layer 3. The intermediate layer 6 is a non-magnetic layer consisting of an alloy of a composition of $Co_{50}Cr_{50}$ (at %). The intermediate layer 6 is formed into a film in the same condition as the CrMo-alloy shown in Table 1. A TEM photograph of the magnetic storage medium according to the third embodiment and the magnetic storage medium according to the second embodiment was taken, and compared those media with one another in connection with a grain size distribution of a plurality of ferromagnetic crystal grains of both the media through the photographs. As a result, the standard deviation of a grain size of a plurality of ferromagnetic crystal grains of the magnetic storage medium according to the third embodiment was smaller than the standard deviation of a grain size of a plurality of ferromagnetic crystal grains of the magnetic storage medium according to the second embodiment, about 3.0 nm or so.

Measurement results of magnetostatic characteristics and R/W characteristics of the magnetic storage medium according to the above-mentioned third embodiment and the magnetic storage medium according to the second embodiment will be described referring to Table 4 hereinafter.

TABLE 4

| Media | $S_{iso}/N_m$ (dB) | $H_c$ [CIRC] (kOe) | $D_{50}$ (kFCI) | O/W (dB) |
|---|---|---|---|---|
| 2nd medium | 29 | 2.5 | 140 | 35 |
| 3rd medium | 30 | 2.5 | 140 | 35 |

The left column of Table 4 shows a sort of media. In the sort of media, there are two types: the magnetic storage medium according to the second embodiment ("2nd medium" in Table 4) and the magnetic storage medium according to the third embodiment ("3rd medium" in Table 4). The subsequent columns in right show the $S_{iso}/N_m$ (dB), the coercive force $H_c$ (kOe) of the medium in a circumference direction, the $D_{50}$ (kFCI) which is indicative of resolution, and the O/W (dB). According to the magnetic storage medium according to the third embodiment, as compared with the magnetic storage medium according to the second embodiment, $S_{iso}/N_m$ is improved from 29 dB to 30 dB, the coercive force $H_c$ of the medium in a circumference direction is 2.5 kOe, $D_{50}$ is 140 kFCI, and O/W is 35 dB, which are same as those of the magnetic storage medium according to the second embodiment. The reason why $S_{iso}/N_m$ is improved is that the standard deviation of a grain size of a plurality of ferromagnetic crystal grains of the magnetic storage medium according to the third embodiment was smaller than the standard deviation of a grain size of a plurality of ferromagnetic crystal grains of the magnetic storage medium according to the second embodiment, as mentioned above, by interposing the intermediate layer 6.

Incidentally, according to the magnetic storage medium according to the third embodiment, the alloy of a composition of $Co_{50}Cr_{50}$ is used as the material of the intermediate layer. However, in the magnetic storage medium according to the present invention, it is acceptable for the material of the intermediate layer to use an alloy consisting of elements of at least one of Co, Cr, Mo, Ta, V, and W, or an oxide or a nitride. At that time, it is preferable that the intermediate layer is different from the primary layer in material. Further, it is preferable for the intermediate layer to use an alloy including Co and Cr which are an intermediate material between a material including Cr of the primary layer 2 and a material including Co of the crystal grains of the recording layer 3.

Figure 7:
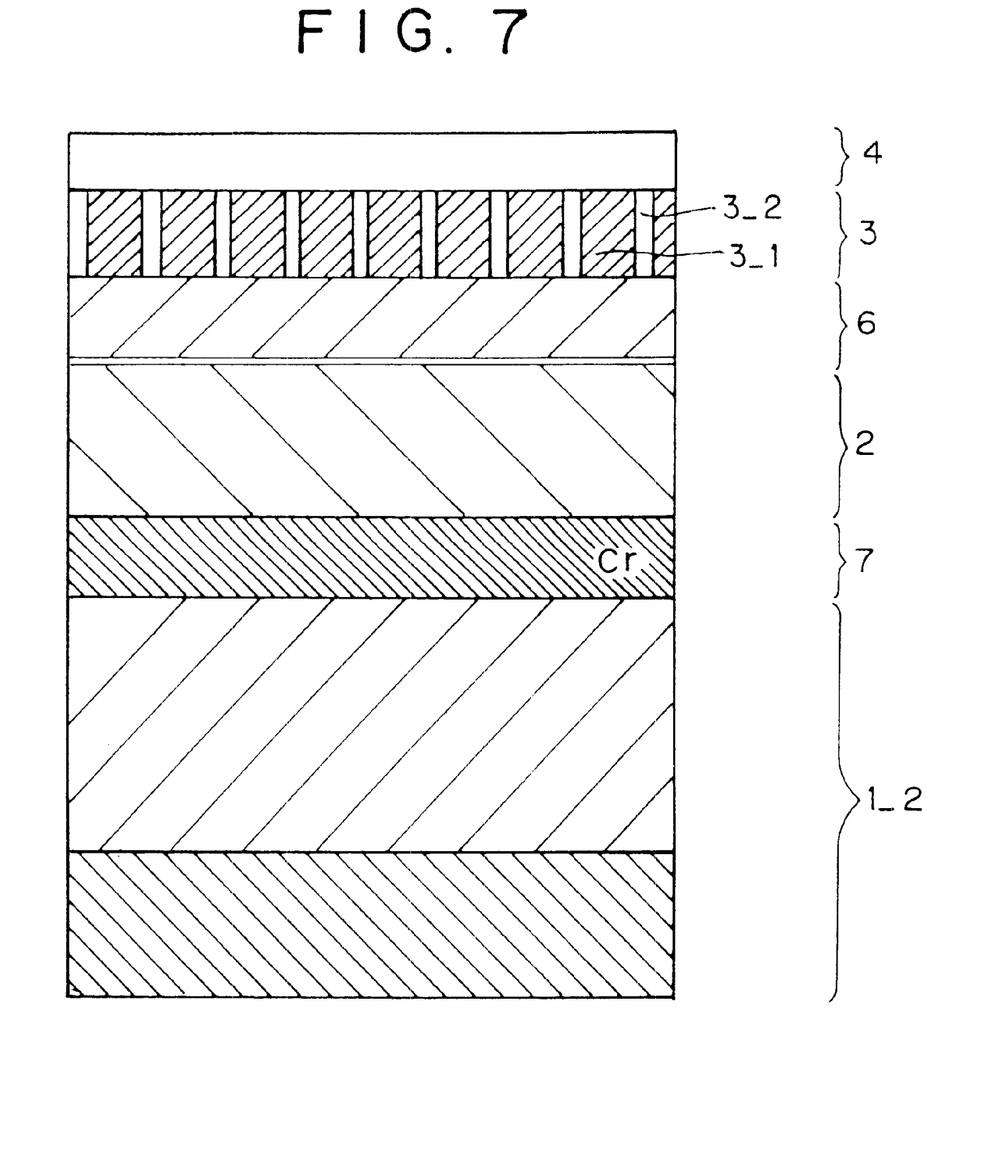
FIG. 7 is a view showing a sectional structure of a magnetic storage medium according to the fourth embodiment of the present invention.

Lastly, the fourth embodiment of present invention will be explained. FIG. 7 is a view showing a sectional structure of a magnetic storage medium according to the fourth embodiment of the present invention.

FIG. 7 is a view showing a sectional structure of a magnetic storage medium according to the fourth embodiment of the present invention.

The magnetic storage medium according to the fourth embodiment is different from the magnetic storage medium according to the third embodiment only in the point that a seed layer 7 having a thickness of 5 nm is disposed between the substrate 1_2 and the primary layer 2. The seed layer 7 is a non-magnetic layer consisting of Cr. The seed layer 7 is formed into a film in the same condition as the CrMo-alloy shown in Table 1.

Measurement results of magnetostatic characteristics and electromagnetic transfer characteristics of the magnetic storage medium according to the above-mentioned fourth embodiment and the magnetic storage medium according to the third embodiment will be described referring to Table 5 hereinafter.

TABLE 5

| Media | $S_{iso}/N_m$ (dB) | $H_c$ [CIRC] (kOe) | $D_{50}$ (kFCI) | O/W (dB) |
|---|---|---|---|---|
| 3rd medium | 30 | 2.5 | 140 | 35 |
| 4th medium | 30 | 2.7 | 145 | 37 |

The left column of Table 5 shows a sort of media. In the sort of media, there are two types: the magnetic storage medium according to the third embodiment ("3rd medium" in Table 5) and the magnetic storage medium according to the fourth embodiment ("4th medium" in Table 5). The subsequent columns in right show in turn the $S_{iso}/N_m$ (db), the coercive force $H_c$ (kOe) of the medium in a circumference direction, the $D_{50}$ (kFCI) which is indicative of resolution, and the O/W (dB). According to the magnetic storage medium according to the fourth embodiment, as compared with the magnetic storage medium according to the third embodiment, the coercive force $H_c$ of the medium in a circumference direction is improved from 2.5 kOe to 2.7 kOe, $D_{50}$ is improved from 140 kFCI to 145 kFCI, and O/W is improved from 35 dB to 37 dB. Both the media offered high $S_{iso}/N_m$, such as 30 dB. The improvement of the coercive force $H_c$ of the medium in a circumference direction shows the fact that an axis of easy magnetization of a plurality of crystal grains of the recording layer 3 is improved in orientation by the presence of the seed layer 7. Here the axis of easy magnetization is oriented in an inside direction of the recording layer 3 on a priority basis. This orientation brings about the improvement of $D_{50}$ and O/W.

Incidentally, according to the magnetic storage medium according to the fourth embodiment, Cr is used as the material of the seed layer. However, in the magnetic storage medium according to the present invention, as the material of the seed layer, it is acceptable to use an alloy consisting of elements of at least one of Cr, Mo, Ta, V, and W, or an oxide or a nitride. At that time, it is preferable that the seed layer is different from the primary layer in material.

Incidentally, according to the magnetic storage medium according to the fourth embodiment, in similar fashion to the magnetic storage medium according to the fourth embodiment, the alloy of a composition of $Co_{50}$ Cr50 is used as the material of the intermediate layer. However, in the magnetic storage medium according to the present invention, it is acceptable for the material of the intermediate layer to use an alloy consisting of elements of at least one of Co, Cr, Mo, Ta, V, and W, or an oxide or a nitride. At that time, it is preferable that the intermediate layer is different from the primary layer in material. Further, it is preferable for the intermediate layer to use an alloy including Co and Cr which are an intermediate material between a material including Cr of the primary layer 2 and a material including Co of the crystal grains of the recording layer 3, as used in the magnetic storage medium according to the fourth embodiment.

Further, while the magnetic storage medium according to the fourth embodiment has both the seed layer 7 and the intermediate layer 6, it is acceptable that the magnetic storage medium according to the present invention includes the seed layer but excludes the intermediate layer.

As mentioned above, according to the present invention, it is possible to provide a magnetic storage medium capable of recording information at high recording density and also of regenerating the information with a high quality of signal (high $S/N_m$), and in addition contributing to the elongation of a life span of the recorded information while having an excellent overwrite characteristic.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A magnetic storage medium comprising:

a non-magnetic substrate; and a recording layer in which crystal grains consisting of a ferromagnetic material are dispersed in a non-magnetic material and axes of easy magnetization of the crystal grains are oriented in parallel to the recording layer, wherein each of the crystal grains dispersed in said recording layer is a columnar shaped grain which penetrates a surface of said recording layer and has height of 30 nm or less, and a mean value of grain sizes of the plurality of crystal grains in an internal direction of said recording layer is 15 nm or less, $(K_u \cdot V)/(k_B \cdot T)$ is not less than 60 where $(K_u \cdot V)/(k_B \cdot T)$ denotes a ratio of a product of a mean value $H_u$ (unit: erg/cm$^3$) of crystal magnetic anisotropy energies of the crystal grains and a mean value V (unit: Cm$^3$) of volumes of the crystal grains to a product of Boltzmann constant $k_B$ (unit: erg/K) and temperature T (unit: K), and a mean value $H_K$ of anisotropic magnetic fields of the crystal grains is 20 kOe or less;

wherein said substrate is a disk shaped substrate, and the axes of easy magnetization of the plurality of crystal grains included in said recording layer are oriented to a circumference direction of said disk shaped substrate.

2. A magnetic storage medium according to claim 1, wherein the crystal grains of said recording layer consist of an alloy including Co and Pt.

3. A magnetic storage medium according to claim 1, wherein the non-magnetic material of said recording layer consists of an oxide ceramics.

4. A magnetic storage medium according to claim 1, wherein a primary layer consisting of a non-magnetic material is interposed between said substrate and said recording layer.

5. A magnetic storage medium according to claim 4, wherein said primary layer consists of an alloy including Cr.

6. A magnetic storage medium according to claim 4, wherein an intermediate layer consisting of a non-magnetic material, which is different from the material constituting said primary layer, is interposed between said primary layer and said recording layer.

7. A magnetic storage medium according to claim 6, wherein said primary layer consists of an alloy including Cr, and the crystal grains of said recording layer consist of an alloy including Co and Pt, and in addition said intermediate layer consists of an alloy including Co and Cr.

8. A magnetic storage medium according to claim 4, wherein a seed layer consisting of a material, which is different from the material constituting said primary layer, is interposed between said substrate and said primary layer.

9. A magnetic storage medium according to claim 4, wherein said primary layer includes a body-centered cubic structure.

10. A magnetic storage medium according to claim 9, wherein said crystal grains have been hetero-epitaxially grown upon an upper surface of said primary layer.

11. A magnetic storage medium according to claim 1, wherein said grains and said non-magnetic material each compose approximately fifty percent, by volume, of the recording layer.

12. A magnetic storage medium according to claim 1, wherein said crystal grains are arranged with substantially uniform density within said non-magnetic material.

13. A magnetic storage medium comprising:

a non-magnetic substrate;

a primary layer disposed above said non-magnetic substrate, said primary layer being formed of a non-magnetic material with a body-centered cubic structure;

a recording layer in which crystal grains consisting of a ferromagnetic material are dispersed in a non-magnetic material and axes of easy magnetization of the crystal grains are oriented in parallel to the recording layer, said crystal grains being hetero-epitaxially grown upon an upper surface of said primary layer;

wherein each of the crystal grains dispersed in said recording layer is a columnar shaped grain which penetrates a surface of said recording layer and has height of 30 nm or less, and a mean value of grain sizes of the crystal grains in an internal direction of said recording layer is 15 nm or less, $(K_u \cdot V)/(k_B \cdot T)$ is not less than 60 where $(K_u \cdot V)/(k_B \cdot T)$ denotes a ratio of a product of a mean value $H_u$ (unit: erg/cm$^3$) of crystal magnetic anisotropy energies of the crystal grains and a mean value V (unit: Cm$^3$) of volumes of the crystal grains to a product of Boltzmann constant $k_B$ (unit: erg/K) and temperature T (unit: K), and a mean value $H_K$ of anisotropic magnetic fields of the crystal grains is 20 kOe or less;

wherein said substrate is a disk shaped substrate, and the axes of easy magnetization of the crystal grains included in said recording layer are oriented to a circumference direction of said disk shaped substrate.

14. A magnetic storage medium according to claim 13, wherein said grains and said non-magnetic material each compose approximately fifty percent, by volume, of the recording layer.

15. A magnetic storage medium according to claim 13, wherein said crystal grains are arranged with substantially uniform density within said non-magnetic material.

* * * * *

UNITED STATES PATENT AND TRADEMARK OFFICE
CERTIFICATE OF CORRECTION

PATENT NO. : 6,562,481 B1
DATED : May 13, 2003
INVENTOR(S) : Isatake Kaitsu et al.

It is certified that error appears in the above-identified patent and that said Letters Patent is hereby corrected as shown below:

Column 15,
Line 19, delete "plurality of";
Line 21, replace "$H_u$" with -- $K_u$ --;
Line 31, delete "plurality of"; and Column 16,
Line 36, replace "$H_u$" with -- $K_u$ --.

Signed and Sealed this

Twenty-seventh Day of January, 2004

JON W. DUDAS
*Acting Director of the United States Patent and Trademark Office*